(12) United States Patent
Vargantwar et al.

(10) Patent No.: US 8,626,224 B1
(45) Date of Patent: Jan. 7, 2014

(54) ADVANCED TRANSMIT POWER CORRECTION

(75) Inventors: Sachin R. Vargantwar, Overland Park, KS (US); Bhagwan Khanka, Lenexa, KS (US); Deveshkumar N. Rai, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 993 days.

(21) Appl. No.: 12/699,244

(22) Filed: Feb. 3, 2010

(51) Int. Cl.
*H04B 7/00* (2006.01)
(52) U.S. Cl.
USPC .... 455/522; 455/127.1; 455/63.1; 455/67.13; 370/318
(58) Field of Classification Search
USPC .......... 455/436, 522, 63.1, 67.13, 422.1, 434, 455/450, 452.1, 452.2, 454, 455, 127.1, 455/464; 370/331–333, 318, 328, 329, 341, 370/437
See application file for complete search history.

(56) References Cited

U.S. PATENT DOCUMENTS

| | | | | |
|---|---|---|---|---|
| 6,047,189 A * | 4/2000 | Yun et al. | ................... | 455/452.2 |
| 7,522,883 B2 * | 4/2009 | Gebara et al. | ................ | 455/63.1 |
| 7,813,753 B2 * | 10/2010 | Santhanam | .................... | 455/522 |
| 8,412,257 B2 * | 4/2013 | Kim et al. | ..................... | 455/522 |
| 8,483,742 B2 * | 7/2013 | Kim et al. | ..................... | 455/522 |
| 2006/0154685 A1 * | 7/2006 | Shin et al. | ..................... | 455/522 |
| 2007/0217397 A1 * | 9/2007 | Cui et al. | ...................... | 370/352 |

* cited by examiner

*Primary Examiner* — Sujatha Sharma

(57) ABSTRACT

Exemplary methods and systems for determining initial transmit power are disclosed herein. An exemplary method involves a mobile station (1) determining an interference level for the forward link; (2) if the determined interference level is greater than a threshold interference level, then determining an interference correction factor to be equal to the minimum of (a) the threshold interference level minus the determined interference level and (b) a predetermined constant; (3) if the determined interference level is less than the threshold interference level, then determining the interference correction factor to be equal to the minimum of: (a) the maximum of: (i) the threshold interference level minus the determined interference level, and (ii) zero, and (b) a predetermined constant; (4) using the determined interference correction factor as a basis for determining an initial transmit power level; and (5) transmitting an initial access probe to the base station at the determined initial transmit power level.

18 Claims, 4 Drawing Sheets

| $E_c/I_o$ | $E_c/I_o$ Correction |
|---|---|
| 0 | -4 |
| -1 | -3.5 |
| -2 | -3 |
| -3 | -2.5 |
| -4 | -2 |
| -5 | -1.5 |
| -6 | -1 |

FIG. 4

ADVANCED TRANSMIT POWER CORRECTION

BACKGROUND

Many people use mobile stations, such as cell phones and personal digital assistants (PDAs), to communicate with cellular wireless networks. These mobile stations and networks typically communicate with each other over a radio frequency (RF) air interface according to a wireless protocol such as Code Division Multiple Access (CDMA), perhaps in conformance with one or more industry specifications such as IS-95 and IS-2000. Wireless networks that operate according to these specifications are often referred to as "1xRTT networks" (or "1x networks" for short), which stands for "Single Carrier Radio Transmission Technology." Another CDMA protocol that may be used is known as Evolution Data Optimized (EV-DO), perhaps in conformance with one or more industry specifications such as IS-856, Rel. 0 and IS-856, Rev. A. Other protocols may be used as well, such as Global System for Mobile Communications (GSM), Time Division Multiple Access (TDMA), WiMax, and/or any others.

These networks typically provide services such as voice, Short Message Service (SMS) messaging, and packet-data communication, among others, and typically include a plurality of base stations, each of which provide one or more coverage areas, such as cells and sectors. These base stations are typically not associated with any subscriber or small group of subscribers in particular; rather, they are placed in publicly-accessible locations and are used by the service provider's customers generally, and their coverage areas collectively blanket cities, rural areas, etc. When a mobile station is positioned in one of these coverage areas, it can communicate over the air interface with the base station, and in turn over one or more circuit-switched and/or packet-switched signaling and/or transport networks to which the base station provides access.

Mobile stations and base stations conduct communication sessions (e.g. voice calls and data sessions) over frequencies known as carriers, each of which may actually be a pair of frequencies, with the base station transmitting to the mobile station on one of the frequencies, and the mobile station transmitting to the base station on the other. This is known as frequency division duplex (FDD). The base-station-to-mobile-station link is known as the forward link, while the mobile-station-to-base-station link is known as the reverse link.

Furthermore, using a sector as an example of a coverage area, base stations may provide service in a given sector on one carrier, or on more than one. An instance of a particular carrier in a particular sector is referred to herein as a sector-carrier. In a typical CDMA system, using a configuration known as radio configuration 3 (RC3), a base station can, on a given sector-carrier, transmit forward-link data on a maximum of 64 distinct channels at any time, each corresponding to a unique 64-bit code known as a Walsh code. Of these channels, typically, 61 of them are available as traffic channels (for user data), while the other 3 are reserved for administrative channels known as the pilot, paging, and sync channels.

When a base station instructs a mobile station operating on a given sector-carrier to use a particular traffic channel for a communication session, the base station does so by instructing the mobile station to tune to one of the 61 traffic channels on that sector-carrier. It is over that assigned traffic channel that the base station will transmit forward-link data to the mobile station during the ensuing communication session. And, in addition to that forward-link channel, the traffic channel also includes a corresponding Walsh-coded reverse-link channel, over which the mobile station transmits data to the base station.

When a mobile station seeks to, as examples, originate a communication session (e.g. a voice call) or respond to a page message from a base station, the mobile station sends one or more messages known as access probes to the base station over a reverse-link access channel. As part of this process, the mobile station determines (e.g. computes) a power level at which to send the initial access probe. The mobile station then sends the initial access probe at that initial transmit power level.

In current implementations, mobile stations determine the initial transmit power (IP) by summing a set of values, all of which pertain to forward-link conditions and pilot-signal strength. In particular, when preparing to send an access probe, a mobile station may sum (i) a value that reflects the power at which the mobile station is receiving transmissions from the base station on the forward link, (ii) one or more constants, and (iii) an interference-correction factor that is derived from the signal-to-noise ratio at which the mobile station is currently receiving a pilot signal from the base station.

If the base station does not acknowledge the initial access probe, the mobile station typically sends a second access probe at an incrementally higher power level (e.g. 3 dB higher than the previous access probe). The mobile station repeats this process (i.e. incrementally increasing the power level) until either receiving an acknowledgement from the base station or reaching a set number (e.g. five) of transmitted access probes. The mobile station may then wait a timeout period, and start again at the initial power level. The mobile station may repeat this entire cycle a set number (e.g. three) of times before concluding that the base station is not reachable, or perhaps waiting a longer timeout period before starting the entire sequence over. And other variations on this access-probe-sending sequence exist as well, as this description is merely an example.

OVERVIEW

According to IS-2000, the mobile station uses the mean input power (mean_input_pwr), a PCS correction (Correction_PCS), and an interference correction (Interference_Correction) to determine the initial transmit power (IP) at which to transmit an access probe. The interference correction is defined as:

$$\text{Interference\_Corr}=\min(\max(-7-E_c/I_o,0),7)).$$

Further, a nominal power parameter (Nom_Pwr), a nominal power extension parameter (Nom_Pwr_Ext), and an Initial Power parameter (Init_Pwr) are also provided to adjust the IP calculation. The Correction_PCS is defined as:

$$\text{Correction\_PCS}=\text{Nom\_Pwr}-(16*\text{Nom\_Pwr\_Ext})+\text{Init\_Pwr}$$

Thus, under IS-2000, IP is calculated in decibels (dB) as:

$$\text{IP}=-(\text{mean\_input\_pwr})-76+\text{Correction\_PCS}+\text{Interference\_Corr}=-(\text{mean\_input\_pwr})-76+\text{Nom\_Pwr}-(16*\text{Nom\_Pwr\_Ext})+\text{Init\_Pwr}+\text{Interference\_Corr}$$

In practice, existing CDMA systems typically use a Received Signal Strength Indicator (RSSI) as the mean input power, and typically set Nom_Pwr_Ext to be equal to zero. Further, the initial power parameter may also be referred to as the Probe Adjust Power (Probe_Pwr_Adj). Yet further, the interference correction may be based on the interference experienced on the forward link ($E_c/I_o$), and thus may also be referred to as the $E_c/I_o$ Correction. As such, an IS-2000 mobile station may calculate initial transmit power according to the following:

$$IP=-(RSSI)-76+(Nom\_Pwr)+Probe\_Adj\_Pwr+E_c/I_o\_Correction$$

In the above, the RSSI is typically an indication of received signal strength at the mobile station, as measured by the mobile station. The Nominal Power (Nom_Pwr) is typically a network setting that is determined by a base station controller or another network entity and relayed to mobile stations via base stations serving the mobile stations. In practice, Nom_Pwr, is typically a constant value from zero and three. Nom_Pwr is typically provided to a mobile station in a page message that is transmitted when the mobile station powers on, but may be provided using other techniques as well. The Probe Power Adjustment parameter is a constant used to offset the overall transmit power used by the mobile station, and may be provided to a mobile station in a system parameter message from a serving base station. Default values are typically in the range of 0 dB to 3 dB, although values may vary without departing from the scope of the invention.

$E_c/I_o$ is a measure of the energy of a particular forward-link signal as compared to the energy of all signals perceived by the mobile station. Thus, $E_c/I_o$ may vary according to the ratio of the power of a signal having the PN offset for a certain sector (i.e., the energy $E_c$ associated with the particular PN code) as compared to the total power of all signals being received by the mobile station (i.e., the total energy including and the energy $E_c$ associated with the PN codes from other sectors, as well as the energy $E_{other}$ at the mobile station from all other sources including noise, etc.). In practice, $E_c/I_o$ is typically determined as follows:

$$E_c/I_o=10*\log(E_c/(E_c+E_{other}))$$

Since the power associated with the particular PN code ($E_c$) is included in the total power ($E_c+E_{other}$) by which it is divided, the value of $E_c/(E_c+E_{other})$ is always less than one, and thus $E_c/I_o$ is always zero or negative in value. Once $E_c/I_o$ is determined, the mobile station may determine $E_c/I_o$ Correction according to the following:

$$E_c/I_o\_Correction=Min(Max((-7-(E_c/I_o)),0),7)$$

The calculation of $E_c/I_o$ Correction thus adds a positive correction when the determined $E_c/I_o$ is greater than negative seven. And when $E_c/I_o$ is less than negative seven, the $E_c/I_o$ Correction is always zero. This may lead to inefficient use of network resources and in particular, may result in some mobile stations transmitting access probes with more power than is required for the base station to receive the access probe (since there is no correction when $E_c/I_o$ is less than negative seven).

Another drawback in current implementations is the use of forward link indicators (such as $E_c/I_o$) to determine IP. Since access probes are transmitted over the reverse link, such techniques rely on the assumption that conditions on the forward link and the reverse link are similar.

Accordingly, methods and systems are provided for determining the initial transmit power (IP) with more granularity, which may help mobile stations to more efficiently utilize reverse-link resources, among other benefits. In particular, according to an exemplary embodiment, a mobile station may implement a bifurcated technique to determine an $E_cI_O$ correction factor, which provides a granularity in determining the correction factor over an extended range of $E_cI_O$ values.

In addition, the mobile station may include indicators of reverse link conditions when determining IP, in addition to using a bifurcated technique to determine an $E_cI_O$ correction factor. As such, an exemplary method may help a mobile station to more precisely determine the IP needed for the access probe to reach a serving base station, and thus, to more efficiently utilize reverse-link resources, among other benefits.

More generally, in one aspect, an exemplary method involves a mobile station (i) determining an interference level for a link between the mobile station and a base station; (ii) if the determined interference level is greater than a threshold interference level, then using a first technique to determine an interference correction factor; (iii) if the determined interference level is less than the threshold interference level, then using a second technique to determine the interference correction factor; (iv) using the determined interference correction factor as a basis for determining an initial transmit power level; and (v) transmitting an initial access probe to the base station at the determined initial transmit power level.

In an exemplary embodiment, the first technique may involve determining the interference correction factor to be equal to the minimum of (a) the threshold interference level minus the determined interference level and (b) a predetermined constant. Further, the second technique may involve determining the interference correction factor to be equal to the minimum of: (a) the maximum of: (i) the threshold interference level minus the determined interference level, and (ii) zero, and (b) a predetermined constant.

Preferably, the determined interference level is $E_c/I_o$ on the forward link. As such, the threshold interference level may be a threshold $E_c/I_o$ (negative seven, for instance), and the determined interference correction factor may be an $E_c/I_o$ correction factor. In such an embodiment, the first technique to determine the interference correction factor may comprise determining the $E_c/I_o$ correction factor to be equal to the minimum of: (a) a threshold $E_c/I_o$ minus the determined $E_c/I_o$ and (b) a predetermined constant, and the second technique to determine the interference correction factor comprises determining the $E_c/I_o$ correction factor to be equal to the minimum of: (a) the maximum of: (i) the threshold $E_c/I_o$ minus the determined $E_c/I_o$ and (ii) zero, and (b) a predetermined constant.

The method may further involve the mobile station receiving an indication of a reverse-link interference level. The mobile station may then use the indication of the reverse-link interference level as a further basis for determining the initial transmit power level. For instance, the mobile station may receive an indication of reverse noise rise (RNR) from a base station, and incorporate the RNR into its determination of initial transmit power.

In another aspect, an exemplary system comprises: (a) a communication interface for receiving communications from a base station via a forward-link, and (b) program logic stored in data storage and executable by at least one processor to: (i) determine an interference level on the forward link; (ii) if the determined interference level is greater than a threshold interference level, then use a first technique to determine an interference correction factor; (iii) if the determined interference level is less than the threshold interference level, then use a second technique to determine the interference correction factor; (iv) use the determined interference correction factor as a basis to determine an initial transmit power; and (v) cause a transmission system to transmit an initial access probe to the base station at the determined initial transmit power level.

These as well as other aspects, advantages, and alternatives, will become apparent to those of ordinary skill in the art by reading the following detailed description, with reference where appropriate to the accompanying drawings.

BRIEF DESCRIPTION OF THE DRAWINGS

An exemplary embodiment of the present invention is described herein with reference to the drawings, in which:

FIG. 4 is a chart illustrating $E_c/I_o$ correction values corresponding to certain $E_c/I_o$ values, according to an exemplary embodiment.

DETAILED DESCRIPTION

1. Exemplary Architecture

Figure 1:
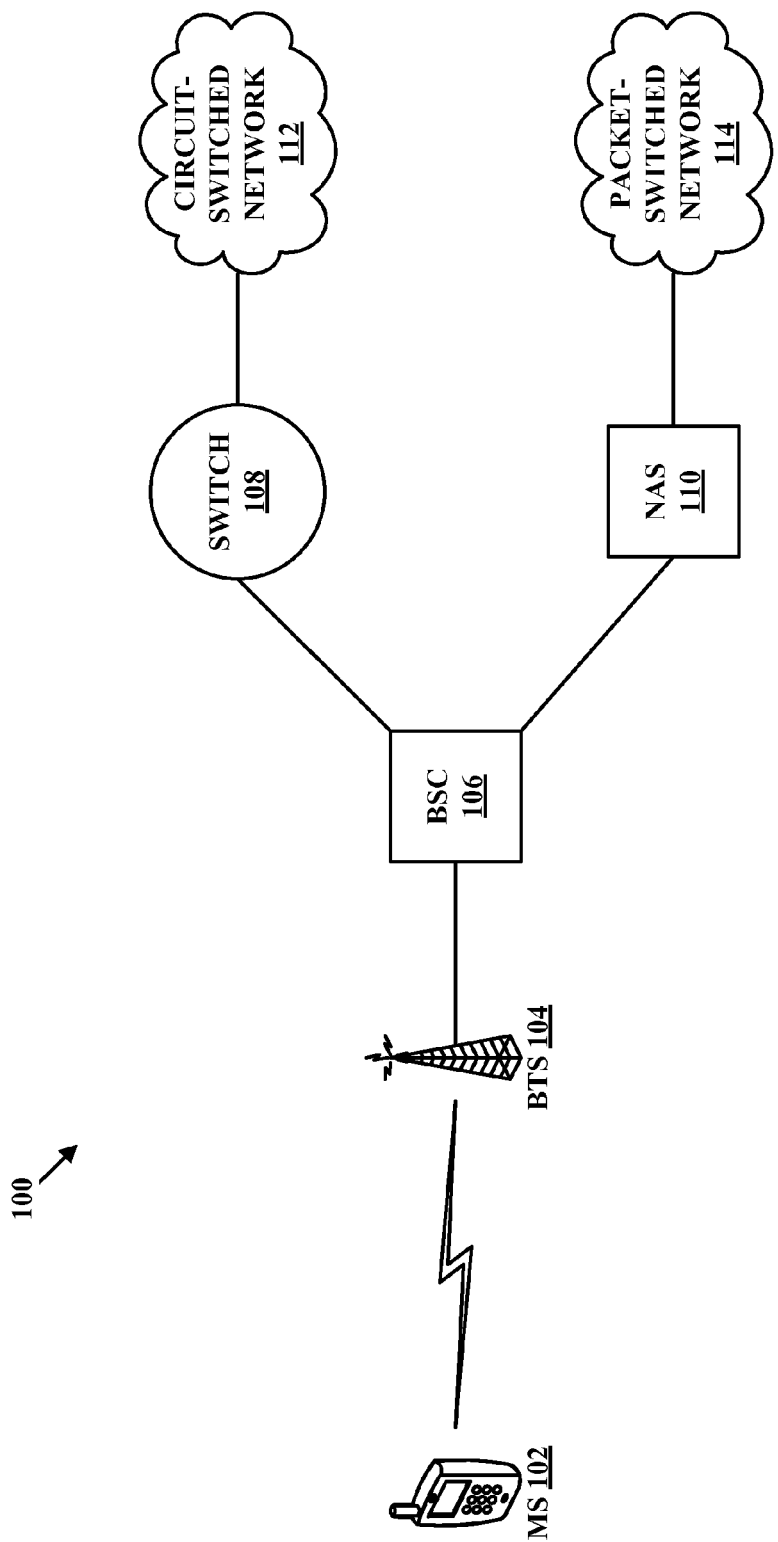
FIG. 1 is a simplified block diagram of a communication system, in accordance with exemplary embodiments.

FIG. 1 is a simplified block diagram of a communication system, in accordance with exemplary embodiments. It should be understood that this and other arrangements described herein are set forth only as examples. Those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software, such as by a processor executing instructions (i.e., program code or logic) stored in memory.

As shown in FIG. 1, a communication system 100 includes a mobile station (MS) 102, a base transceiver station (BTS) 104, a base station controller (BSC) 106, a switch 108, a network access server (NAS) 110, a circuit-switched network 112, and a packet-switched network 114. Additional entities could be present as well, such as additional mobile stations in communication with BTS 104, additional BTSs in communication with BSC 106, additional BSCs in communication with switch 108, and so on. Instead or in addition, there could be one or more devices and/or networks making up at least part of one or more communication links. For example, there could be one or more routers, cable modems, and/or other devices or networks on the link between NAS 110 and packet-switched network 114.

Mobile station 102 may be any mobile device arranged to carry out the mobile-station functions described herein. As such, mobile station 102 may include a user interface, a wireless-communication interface, a processor, and data storage comprising instructions executable by the processor for carrying out those mobile-station functions. The user interface may include buttons, a touchscreen, a microphone, and/or any other elements for receiving inputs, as well as a speaker, one or more displays, and/or any other elements for communicating outputs.

The wireless-communication interface may include an antenna and a chipset suitable for communicating with one or more base stations over suitable air interfaces. For example, the chipset could be suitable for CDMA communication. The chipset or wireless-communication interface in general may also or instead be able to communicate with other types of networks and devices, such as EV-DO networks, Wi-Fi networks, Bluetooth devices, and/or one or more additional types of networks and devices. The processor and data storage may be any suitable components known to those of skill in the art. As examples, mobile station 102 could be or include a cell phone, a PDA, a computer, a laptop computer, a hybrid CDMA/EV-DO device, and/or a multi-mode cellular/Wi-Fi device. Further, while the term "mobile station" is a term of art commonly used for such devices, the term "mobile station" should be understood to include non-mobile devices, such as a personal computer or any other device capable of the functionality of a mobile station described herein.

BTS 104 may be any network element arranged to carry out the BTS functions described herein. As such, BTS 104 may include a communication interface, a processor, and data storage comprising instructions executable by the processor to carry out those BTS functions. The communication interface may include one or more antennas, chipsets, and/or other components for providing one or more CDMA coverage areas such as cells and sectors, for communicating with mobile stations such as mobile station 102 over an air interface. The communication interface may also include one or more wired (e.g. Ethernet) and/or wireless (e.g. WiFi or WiMax) interfaces for communicating with at least BSC 106.

In a further aspect, BTS 104 may be configured to determine a measure of reverse-link interference referred to as reverse-noise rise (RNR). RNR is generally the result of a calculation of the difference between (a) the current level of noise (i.e. power level of all received transmissions) on the reverse link as received at the base station and (b) a baseline level of noise on the reverse link. In one implementation, the baseline level could be the average of the daily minimums of reverse noise over the previous week, though many other ways of calculating the baseline level could be used. In general, RNR is a measure of how high the reverse noise has risen above the baseline. A higher RNR generally correlates with a lower success rate of base stations being able to receive and acknowledge access probes from mobile stations, while a lower RNR generally correlates with a higher success rate. Alternatively, the BTS 104 may work with other network entities to determine RNR, or RNR may be calculated by other entities altogether. Furthermore, the BTS 104 (or another entity) is preferably configured to transmit the RNR to mobile stations operating in its service area.

BSC 106 may be any network element arranged to carry out the BSC functions described herein. As such, BSC 106 may include a communication interface, a processor, and data storage comprising instructions executable by the processor to carry out those BSC functions. The communication interface may include one or more wired (e.g. Ethernet) and/or wireless (e.g. WiFi or WiMax) interfaces for communicating with at least BTS 104, switch 108, and NAS 110. In general, BSC 106 functions to control one or more BTSs such as BTS 104, and to provide those one or more BTSs with connections to devices such as switch 108 and NAS 110.

Note that the combination of BTS 104 and BSC 106 may be considered a base station. However, BTS 104 or BSC 106 could, taken alone, be considered a base station as well. Furthermore, a base station may be considered to be either or both of those devices, and perhaps make use of one or more functions provided by switch 108, NAS 110, and/or any other entity.

Switch 108 may be any networking element (e.g. a mobile switching center (MSC)) arranged to carry out the switch functions described herein. Thus, switch 108 may include a communication interface, a processor, and data storage comprising instructions executable by the processor to carry out those switch functions. The communication interface may include one or more wired (e.g. Ethernet) and/or wireless (e.g. WiFi or WiMax) interfaces for communicating with at least BSC 106 and circuit-switched network 112. In general, switch 108 acts as a switch between one or more BSCs, such as BSC 106, and circuit-switched network 112, facilitating communication between mobile stations and circuit-switched network 112.

NAS 110 may be any networking element (e.g. a packet data serving node (PDSN)) arranged to carry out the NAS functions described herein. As such, NAS 110 may include a communication interface, a processor, and data storage comprising instructions executable by the processor for carrying out those NAS functions. The communication interface may include one or more wired (e.g. Ethernet) and/or wireless (e.g. WiFi or WiMax) interfaces for communicating with at least BSC 106 and packet-switched network 114. In general, NAS 110 acts as a network access server between one or more BSCs, such as BSC 106, and packet-switched network 114, facilitating packet-data communication between mobile stations and packet-switched network 114.

Circuit-switched network 112 may be the network known generally as the public switched telephone network (PSTN), but may also or instead include one or more other circuit-switched networks.

Packet-switched network 114 may be the global packet-data network generally referred to as the Internet. However, packet-switched network 114 may also be or include one or more other packet-data networks. As such, packet-switched network 114 may include one or more wide area networks, one or more local area networks, one or more public networks, one or more private networks, one or more wired networks, one or more wireless networks, and/or one or more networks of any other type. Devices in communication with packet-switched network 114 may exchange data using a packet-switched protocol such as the Internet Protocol (IP), and may be identified by an address such as an IP address.

2. Exemplary Operation a. A First Exemplary Method

Figure 2:
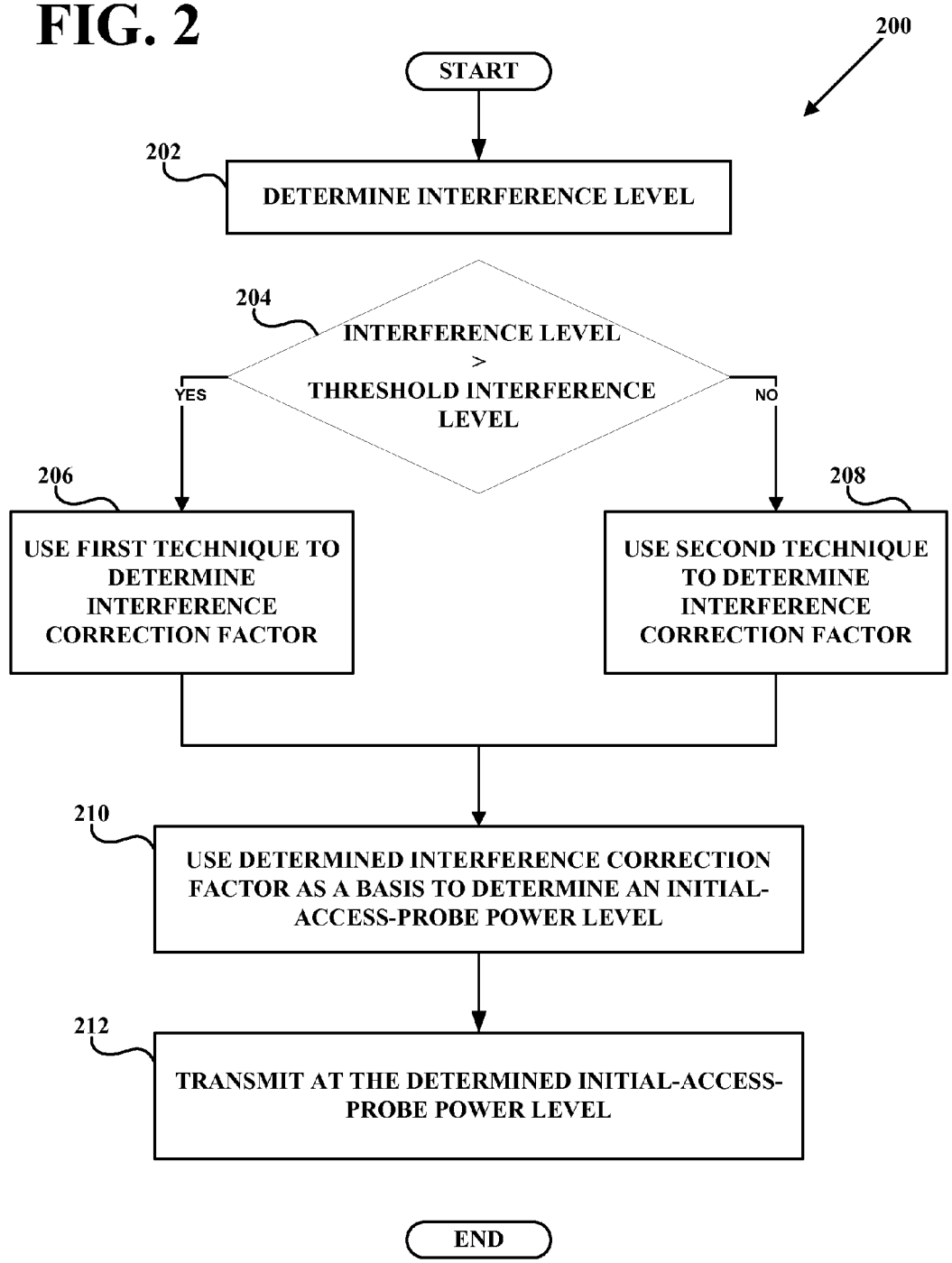
FIG. 2 depicts a method, in accordance with exemplary embodiments.

FIG. 2 depicts a flowchart of a first exemplary method 200 carried out by a mobile station, in accordance with an exemplary embodiment. In general, exemplary methods, such as method 200, may be used to transmit a signal, which is preferably an access probe. However, it should be understood that an exemplary method may also be used in conjunction with other types of signals as well. The signal is preferably transmitted with an initial power level that is determined using with an $E_c/I_o$_Correction value as determined by a bifurcated $E_c/I_o$_Correction technique.

As shown in FIG. 2, at block 202, the mobile station determines an interference level for a link between the mobile station and a base station, which is typically a measure of interference for the forward-link. At block 204, the mobile station determines whether or not the determined interference level is greater than a threshold interference level. If the determined interference level is greater than a threshold interference level, then the mobile station uses a first technique to determine an interference correction factor, as shown by block 206. On the other hand, if the determined interference level is less than the threshold interference level, then the mobile station uses a second technique to determine the interference correction factor, as shown by block 208. The mobile station then uses the determined interference correction factor as a basis for determining an initial transmit power level, as shown by block 210, and transmits an initial access probe to a base station at the determined initial transmit power level, as shown by block 212.

Preferably, the determined interference level is the $E_c/I_o$ on the forward link between the mobile station and the base station. Further, in an exemplary embodiment, the threshold interference level is a threshold $E_c/I_o$ value. As such, the mobile station may use two different techniques to determine an $E_c/I_o$ correction factor, depending upon whether the $E_c/I_o$ on the forward link is greater than or less than the threshold $E_c/I_o$. Advantageously, both techniques provide an $E_c/I_o$ correction factor with at least some granularity, varying the amount of correction depending upon the $E_c/I_o$ on the forward link. This may help a mobile station to more precisely determine the IP needed for an access probe to reach the base station, especially as compared to existing techniques which essentially use a correction factor of zero for a range of $E_c/I_o$ values (e.g., $E_c/I_o$ greater than negative seven).

It should be understood that, with regards to $E_c/I_o$, the value of $E_c/I_o$ is inversely correlated to the level of interference on the forward link. Thus, the more interference exists, the lower the value of $E_c/I_o$. For instance, an $E_c/I_o$ of negative ten indicates that more interference exists on the forward link than an $E_c/I_o$ of negative five or negative two. Thus, the first technique, which is employed when $E_c/I_o$ is greater than the threshold $E_c/I_o$ is employed when less interference exists, as compared when $E_c/I_o$ is less than the threshold $E_c/I_o$ and the second technique is employed.

In an exemplary embodiment, the first technique, used when less interference exists on the forward link (i.e., when $E_c/I_o$ is greater than the threshold), may involve determining the $E_c/I_o$ correction factor ($E_c/I_o$_Correction) as:

$$E_c/I_o\_Correction = MIN((-7-(E_c/I_o)), 7)$$

Further, the second technique, used when more interference exists (i.e., when $E_c/I_o$ is less than the threshold), may involve determining $E_c/I_o$_Correction as equal to MIN(MAX(-7-(Ec/Io)), 0), 7). However, it should be understood that other techniques may be used without departing from the scope of the invention.

In one exemplary embodiment, the threshold $E_c/I_o$ is negative seven. Therefore, the first technique is preferably used when $E_c/I_o$ is greater than negative seven (i.e.; between zero and negative six), while the second technique is used when $E_c/I_o$ is less than negative seven. FIG. 4 is a chart illustrating $E_c/I_o$ correction factor values resulting from using the first technique for $E_c/I_o$ values ranging from zero to negative six.

b. A Second Exemplary Method

Figure 3:
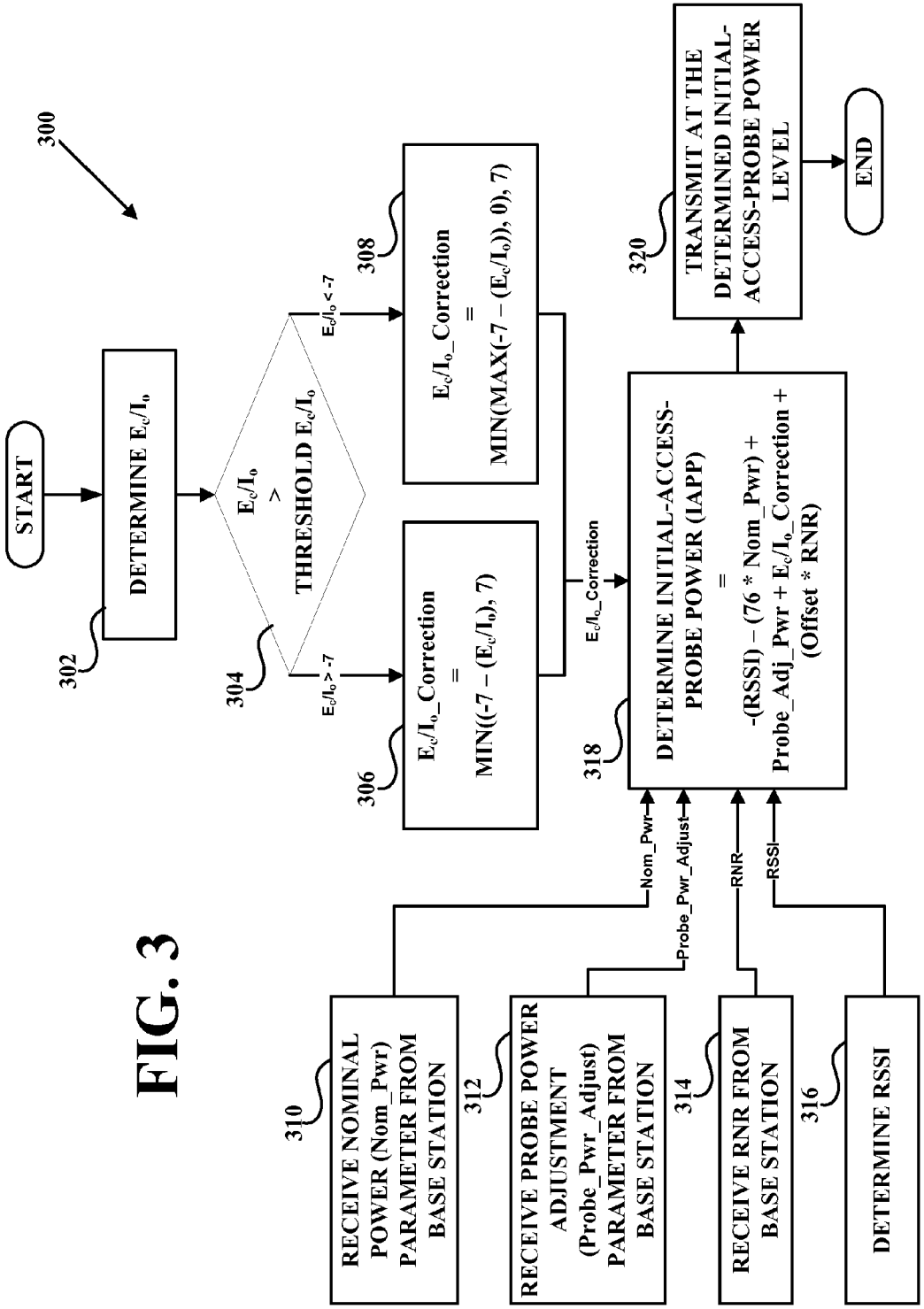
FIG. 3 depicts another method, in accordance with exemplary embodiments.

FIG. 3 is a flowchart of a method 300 that may be carried out by a mobile station, in accordance with an exemplary embodiment. FIG. 3 is similar to FIG. 2, but illustrates a specific embodiment where the threshold $E_c/I_o$ is equal to negative seven. FIG. 3 also shows how additional parameters, such as the RNR, may be incorporated in the process of determining initial transmit power. By incorporating RNR when determining initial transmit power, a mobile station may be able to more precisely determine the traffic load on the reverse-link, as compared to when only forward-link parameters are used. This may help improve accuracy in determining IP, especially when forward and reverse link conditions differ (e.g., when interference levels on the forward and reverse link differ).

The method 300 involves the mobile station determining the $E_c/I_o$ on the forward link, as shown by block 302. At block 304, the mobile station determines whether or not the determined $E_c/I_o$ is greater than the threshold $E_c/I_o$, which in this embodiment is negative seven. If $E_c/I_o$ is greater than negative seven, then the mobile station determines $E_c/I_o$ Correction to be equal to the minimum of (a) negative seven (i.e., the threshold interference level) minus the determined $E_c/I_o$ (or more generally the determined interference level) and (b) seven (or more generally, a predetermined constant), as shown by block 306. On the other hand, if $E_c/I_o$ is less than negative seven, then the mobile station determines $E_c/I_o$ Correction to be equal to the minimum of (a) the maximum of (i) negative seven (i.e., the threshold interference level) minus the determined $E_c/I_o$ (or more generally the determined interference level) and (ii) zero, and (b) seven (or more generally, a predetermined constant), as shown by block 308. It should be understood that the threshold of negative seven is used in an exemplary embodiment in accordance with existing CDMA standards, and that the threshold $E_c/I_o$ and the predetermined constant may be selected and vary as a matter of engineering design choice.

In a further aspect of method 300, the mobile station may itself determine various other parameters that are utilized in determining IP (or alternatively, may receive such parameters from other sources such as the base station). In method 300, the mobile station receives the Nominal Power (Nom_Pwr) from the base station, as shown in block 310. Typically, the mobile station receives Nom_Pwr from the base station when the mobile station powers on, although it is possible for the mobile station to receive or determine Nom_Pwr by other means, without departing from the scope of the invention. The mobile station also receives a Probe Power Adjustment parameter (Probe_Pwr_Adjust) from the base station, as shown by block 312, and the RNR for the reverse-link from the base station, as shown in block 314. In addition, the mobile station calculates RSSI for the forward-link, as shown by block 316.

As shown in block 318, the mobile station then determines the initial transmit power (IP) as:

$$IP = -RSSI - (76*Nom\_Pwr) + Probe\_Adj\_Pwr + E_c/I_o\_Correction + (offset*RNR)$$

Note that this differs from the standard IP calculation in at least that the $E_c/I_o$ correction factor is calculated using a more-granular bifurcated process (as shown in blocks 306 and 308), and that RNR is incorporated in the calculation. The mobile station may then transmit an access probe at the determined IP.

In the above determination of IP, the RNR is multiplied by an offset value, which is typically a predetermined constant that may be selected as a matter of engineering design choice, and is preferably configurable in the range of 0.5 to 1.0. It should be understood, however, that RNR, and other indicators of reverse-link traffic load or interference, may also be incorporated into the determination of IP. For example, co-owned U.S. patent application Ser. No. 12/172,102, which is incorporated by reference in its entirety herein, teaches the use of various reverse-link-loading indicators, including RNR, in the determination of IP, any of which may be incorporated in the methods and systems disclosed herein.

Exemplary embodiments of the present invention have been described above. It should be understood the word "exemplary" is used herein to mean "serving as an example, instance, or illustration." Any embodiment described herein as "exemplary" is not necessarily to be construed as preferred or advantageous over other embodiments. In addition, those skilled in the art will understand that changes and modifications may be made to these exemplary embodiments without departing from the true scope and spirit of the invention, which is defined by the claims.

We claim:
1. A method comprising:
   a mobile station determining an interference level for a link between the mobile station and a base station;
   if the determined interference level is greater than a threshold interference level, then the mobile station using a first technique to determine an interference correction factor;
   if the determined interference level is less than the threshold interference level, then the mobile station using a second technique to determine the interference correction factor, wherein the second technique comprises determining the interference correction factor to be equal to the minimum of: (a) the maximum of (i) the threshold interference level minus the determined interference level and (ii) zero, and (b) a predetermined constant;
   the mobile station using the determined interference correction factor as a basis for determining an initial transmit power level; and
   the mobile station transmitting an initial access probe to the base station at the determined initial transmit power level.

2. The method of claim 1, wherein the first technique comprises determining the interference correction factor to be equal to the minimum of:
   (a) the threshold interference level minus the determined interference level, and
   (b) a predetermined constant.

3. The method of claim 1, wherein the determined interference level comprises a forward-link interference level.

4. The method of claim 1, further comprising:
   the mobile station receiving an indication of a reverse-link interference level; and
   the mobile station using the indication of the reverse-link interference level as a further basis for determining the initial transmit power level.

5. The method of claim 1, further comprising the mobile station using reverse noise rise (RNR) as a further basis for determining the initial transmit power level.

6. The method of claim 1, wherein determining the initial transmit power level comprises the mobile station using at least one of (a) a received signal strength indicator (RSSI), (b) a nominal power parameter, and (c) a probe power adjustment parameter as a further basis for determining the initial transmit power level.

7. The method of claim 6, wherein determining the initial transmit power level comprises determining the initial transmit power level to be equal to the sum of (a) negative of the RSSI, (b) negative of a constant times the nominal power parameter, (c) the probe power adjustment parameter, and (d) the determined interference correction factor.

8. The method of claim 1, wherein determining the interference level comprises determining $E_c/I_o$, wherein the threshold interference level comprises a threshold $E_c/I_o$, and wherein the determined interference correction factor comprises an $E_c/I_o$ correction factor.

9. The method of claim 8, wherein the first technique to determine the interference correction factor comprises determining the $E_c/I_o$ correction factor to be equal to the minimum of:
   (a) a threshold $E_c/I_o$ minus the determined $E_c/I_o$, and
   (b) a predetermined constant.

10. The method of claim 8, wherein the second technique to determine the interference correction factor comprises determining the $E_c/I_o$ correction factor to be equal to the minimum of:

(a) the maximum of:
(i) the threshold $E_c/I_o$ minus the determined $E_c/I_o$, and
(ii) zero, and
(b) a predetermined constant.

11. The method of claim 8, wherein the threshold $E_c/I_o$ is negative seven.

12. A system comprising:
a communication interface for receiving communications from a base station via a forward-link;
program logic stored in data storage and executable by at least one processor to:
determine an interference level on the forward link;
if the determined interference level is greater than a threshold interference level, then use a first technique to determine an interference correction factor, wherein the first technique comprises determining the interference correction factor to be equal to the minimum of (a) the threshold interference level minus the determined interference level and (b) a predetermined constant;
if the determined interference level is less than the threshold interference level, then use a second technique to determine the interference correction factor;
use the determined interference correction factor as a basis to determine an initial transmit power; and
cause a transmission system to transmit an initial access probe to the base station at the determined initial transmit power level.

13. The system of claim 12, wherein the second technique comprises determining the interference correction factor to be equal to the minimum of (a) the maximum of (i) the threshold interference level minus the determined interference level and (ii) zero, and (b) a predetermined constant.

14. The system of claim 12, further comprising program logic stored in the data storage and executable by the at least one processor to:
receive an indication of a reverse-link interference level; and
use the indication of the reverse-link interference level as a further basis to determine the initial transmit power level.

15. The system of claim 12, further comprising program logic stored in the data storage and executable by the at least one processor to use reverse noise rise (RNR) as a further basis to determine the initial transmit power level.

16. The system of claim 12, wherein the program logic stored in the data storage and executable by the at least one processor to determine the initial transmit power further comprises program logic stored in the data storage and executable by the at least one processor to:
use one or more of (a) a received signal strength indicator (RSSI), (b) a nominal power parameter, and (c) a probe power adjustment parameter as further bases to determine the initial transmit power level.

17. The system of claim 12, wherein the interference level on the forward link comprises $E_c/I_o$ on the forward link, wherein the threshold interference level comprises a threshold $E_c/I_o$, and wherein the determined interference correction factor comprises an $E_c/I_o$ correction factor.

18. The system of claim 17:
wherein the first technique to determine the interference correction factor comprises determining the $E_c/I_o$ correction factor to be equal to the minimum of:
(a) a threshold $E_c/I_o$ minus the determined $E_c/I_o$, and
(b) a predetermined constant, and
wherein the second technique to determine the interference correction factor comprises determining the $E_c/I_o$ correction factor to be equal to the minimum of:
(a) the maximum of:
(i) the threshold $E_c/I_o$ minus the determined $E_c/I_o$, and
(ii) zero, and
(b) a predetermined constant.

* * * * *